(12) United States Patent
Gattozzi et al.

(10) Patent No.: US 9,085,229 B2
(45) Date of Patent: Jul. 21, 2015

(54) FUEL TANK ASSEMBLIES, COMPONENTS, AND METHODS OF MANUFACTURE

(75) Inventors: Giuseppe A. Gattozzi, LaSalle (CA); Harald Knueppel, Amherstburg (CA); Ted J. Latouf, Windsor (CA); James R. Osborne, Davisburg, MI (US); Christopher K. Quick, LaSalle (CA); Steve L. Toth, Windsor (CA)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 1225 days.

(21) Appl. No.: 12/268,683

(22) Filed: Nov. 11, 2008

(65) Prior Publication Data

US 2010/0116366 A1 May 13, 2010

(51) Int. Cl.
| | |
|---|---|
| *B60K 15/03* | (2006.01) |
| *B29C 49/20* | (2006.01) |
| *F02M 37/10* | (2006.01) |
| *B29C 49/04* | (2006.01) |
| *B29L 31/00* | (2006.01) |

(52) U.S. Cl.
CPC .................. *B60K 15/03* (2013.01); *B29C 49/20* (2013.01); *F02M 37/103* (2013.01); *F02M 37/106* (2013.01); *B29C 49/04* (2013.01); *B29C 2049/2008* (2013.01); *B29C 2049/2013* (2013.01); *B29L 2031/7172* (2013.01); *B60K 2015/03453* (2013.01)

(58) Field of Classification Search
CPC .................................................. B60K 15/03177
USPC .............. 24/DIG. 48; 123/509; 220/562–564, 220/651–653; 248/75, 49, 65, 70, 73, 74.1, 248/74.2, 74.3, 230.7, 230.8, 231.81; 403/108

See application file for complete search history.

(56) References Cited

U.S. PATENT DOCUMENTS

| | | | | |
|---|---|---|---|---|
| 473,919 | A | * | 5/1892 | Edsall ....................... 248/292.12 |
| 1,343,279 | A | * | 6/1920 | Reynolds ......................... 248/49 |
| 4,458,385 | A | * | 7/1984 | Espinoza .................... 24/16 PB |
| 4,719,072 | A | | 1/1988 | Kojima et al. |
| 4,891,000 | A | | 1/1990 | Ishii |
| 4,952,347 | A | | 8/1990 | Kasugai |
| 5,326,514 | A | | 7/1994 | Linden et al. |
| 5,806,813 | A | * | 9/1998 | Binelli ............................ 248/73 |
| 6,367,503 | B1 | | 4/2002 | Keller et al. |
| 6,712,234 | B2 | * | 3/2004 | Boecker ......................... 220/563 |
| 2003/0015537 | A1 | * | 1/2003 | Konja ........................... 220/563 |
| 2004/0129708 | A1 | | 7/2004 | Borchert et al. |
| 2006/0102634 | A1 | * | 5/2006 | Potter et al. ................... 220/562 |

OTHER PUBLICATIONS

Article—Dan Garney, "New Vehicle Technology Highlights" Automotive Engineering International Magazine, Oct. 2003, excerpts pp. 56, 58, 60-61.

(Continued)

*Primary Examiner* — Fenn Mathew
*Assistant Examiner* — Chetan Chandra
(74) *Attorney, Agent, or Firm* — Reising Ethington P.C.

(57) ABSTRACT

A fuel tank assembly includes a fuel tank to contain fuel therein, and a carrier assembly disposed in the fuel tank. The carrier assembly includes a plurality of application-specific fuel system products, a carrier common to a plurality of different fuel tank assemblies to carry the products, and a plurality of common components to mount the products with respect to the carrier in application-specific positions.

19 Claims, 8 Drawing Sheets

(56) References Cited

OTHER PUBLICATIONS

Article—John Osborne, "Hard act to follow" Materials-Ceramics, Automotive Manufacturing Solutions Magazine, Jul./Aug. 2004, pp. 66-69.

Webarticle—"Ford GT Gets Industry-First Fuel-Tank System Designed by TI Automotive," Website: http://local2209.org/content/showquestion2.asp?faq=19&fldAuto=365.

* cited by examiner

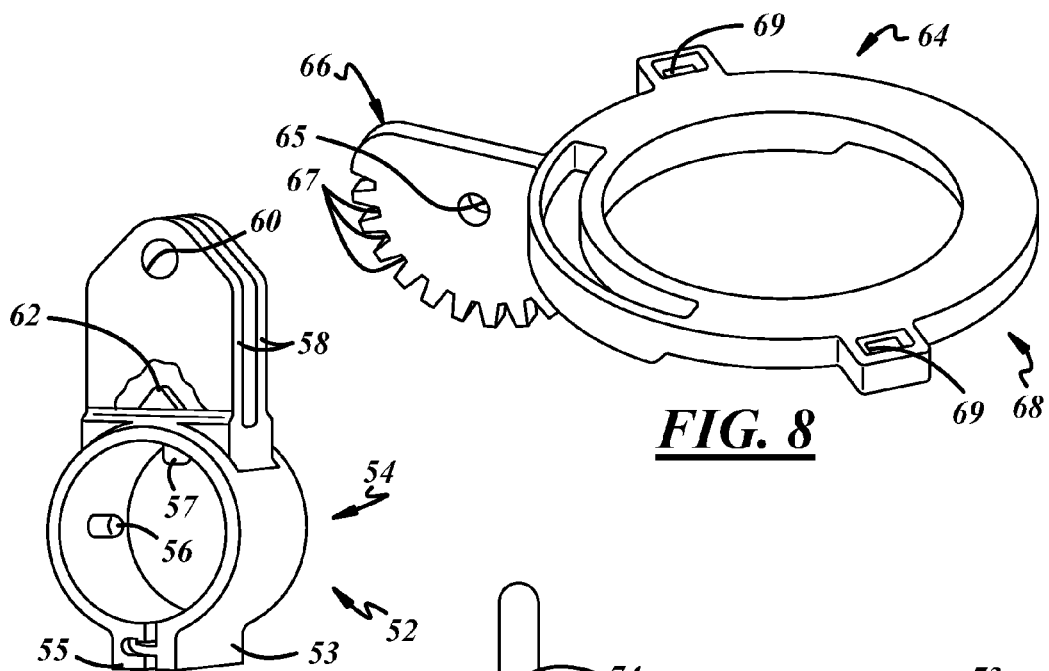
FIG. 8
FIG. 7
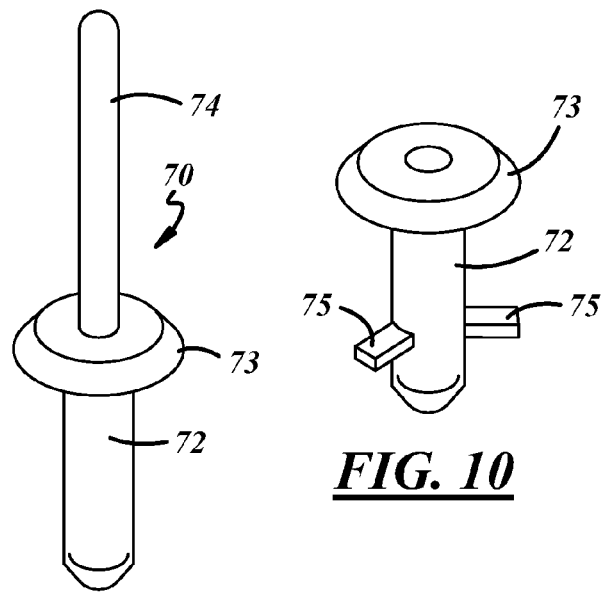
FIG. 10
FIG. 9
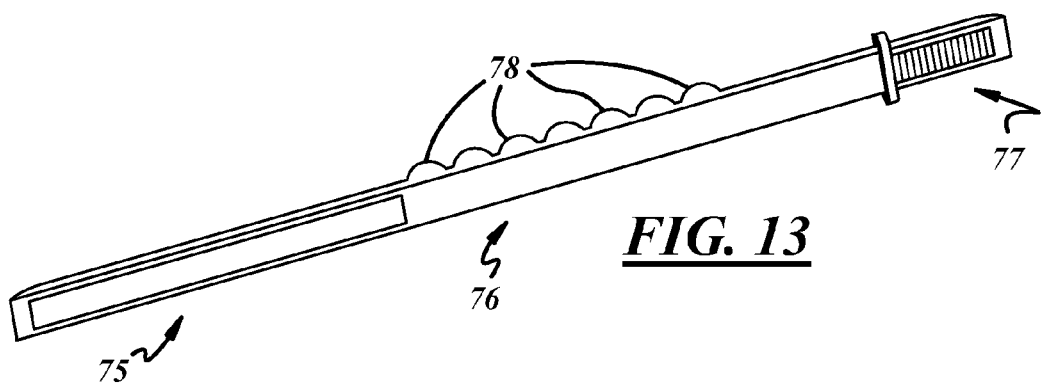
FIG. 13

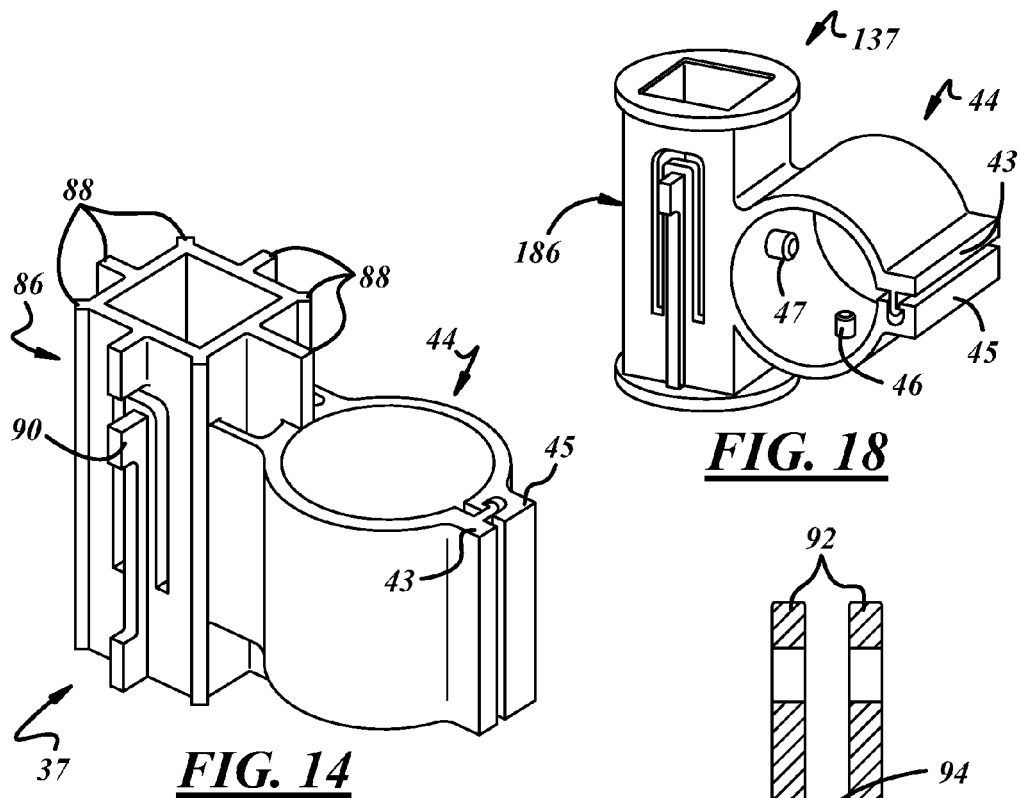
FIG. 18
FIG. 14
FIG. 15
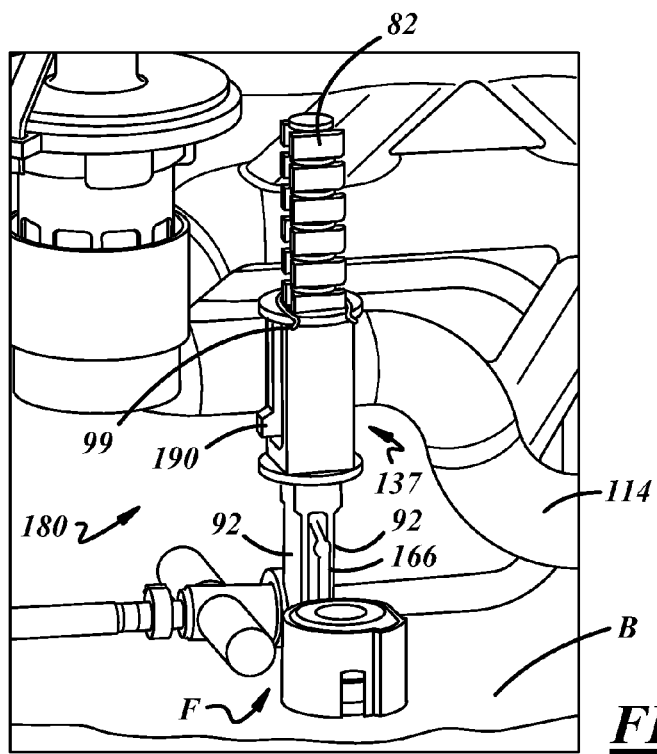
FIG. 19

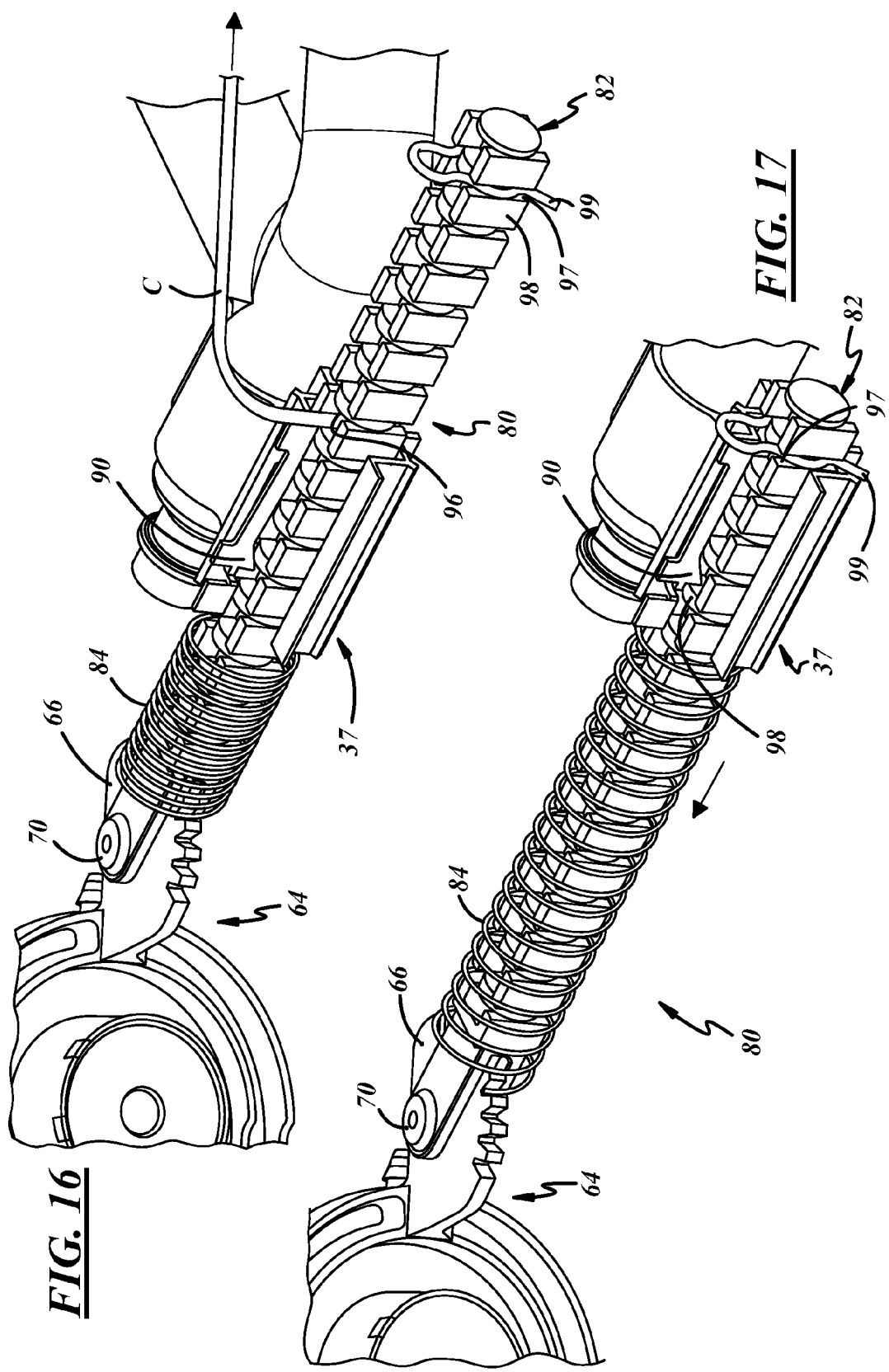

FUEL TANK ASSEMBLIES, COMPONENTS, AND METHODS OF MANUFACTURE

FIELD OF THE INVENTION

The present invention relates generally to fuel systems for internal combustion engines and, more particularly to fuel tanks having fuel system components contained therein.

BACKGROUND OF THE INVENTION

Conventional automotive fuel tanks contain not only fuel, but also various fuel system products, such as a fuel pump, fuel filter, fuel level sensor, fuel lines, and vent valves. Such products are usually installed through a plurality of large openings in the fuel tank after the fuel tank is formed such as by blow molding.

Increasingly, fuel tanks may be manufactured in a ship-in-a-bottle manner, in which a fuel tank is blow molded around the various fuel system components. The fuel system components may be mounted on a carrier, which gets lifted into position on a blow pin within a parison that is extruded downwardly between open blow molding tooling. The tooling closes around the parison and blow pin, which introduces pressurized gas into the parison to expand the parison into conformity with the tooling.

SUMMARY OF THE INVENTION

A fuel tank assembly according to one implementation includes a fuel tank to contain fuel therein, and a carrier assembly disposed in the fuel tank. The carrier assembly includes a plurality of application-specific fuel system products, a common carrier to carry the products, and a plurality of common components to mount the products with respect to the carrier in application-specific positions.

At least some of the objects, features and advantages that may be achieved by at least certain embodiments of the invention include providing a fuel tank assembly, fuel system components, and a method of manufacturing a fuel tank assembly that easily positions various products and components within a fuel tank in desired positions according to desired accuracy, increases commonality of components across different applications, wherein the fuel tank assembly is of relatively simple design, economical manufacture and assembly, rugged, durable, reliable, and in service has a long useful life.

Of course, other objects, features and advantages will be apparent in view of this disclosure to those skilled in the art. Various other configurations embodying the invention may achieve more or less than the noted objects, features or advantages.

BRIEF DESCRIPTION OF THE DRAWINGS

These and other objects, features and advantages of the present invention will be apparent from the following detailed description of preferred embodiments and best mode, appended claims, and accompanying drawings in which:

FIG. 7 is a perspective view of one form of a component mounting bracket of the fuel tank assembly of FIG. 1;

FIG. 8 is a perspective view of one form of a common product holder of the fuel tank assembly of FIG. 1;

FIG. 9 is a rivet that is shown in a deactivated state and that may be used to couple the common product holder of FIG. 8 to the component mounting bracket of FIG. 7;

FIG. 10 is the rivet of FIG. 9 shown in an activated state;

FIG. 13 is a perspective view of a common mounting strap of the fuel tank assembly of FIG. 1;

FIG. 14 is a perspective view of a mounting bracket for a positioning rod of the fuel tank assembly of FIG. 1;

FIG. 15 is a cross-sectional view of a portion of a positioning rod of the fuel tank assembly of FIG. 1;

FIG. 16 is an enlarged perspective view of a portion of the fuel tank assembly of FIG. 1, showing the positioning rod in a retracted state;

FIG. 17 is an enlarged perspective view of a portion of the fuel tank assembly of FIG. 1, showing the positioning rod in an advanced state;

FIG. 18 is a perspective view of another mounting bracket for a positioning rod of the fuel tank assembly of FIG. 1; and FIG. 19 is a perspective view of another form of a fuel tank assembly including the mounting bracket of FIG. 18.

DETAILED DESCRIPTION OF PREFERRED EMBODIMENTS

Figure 1:
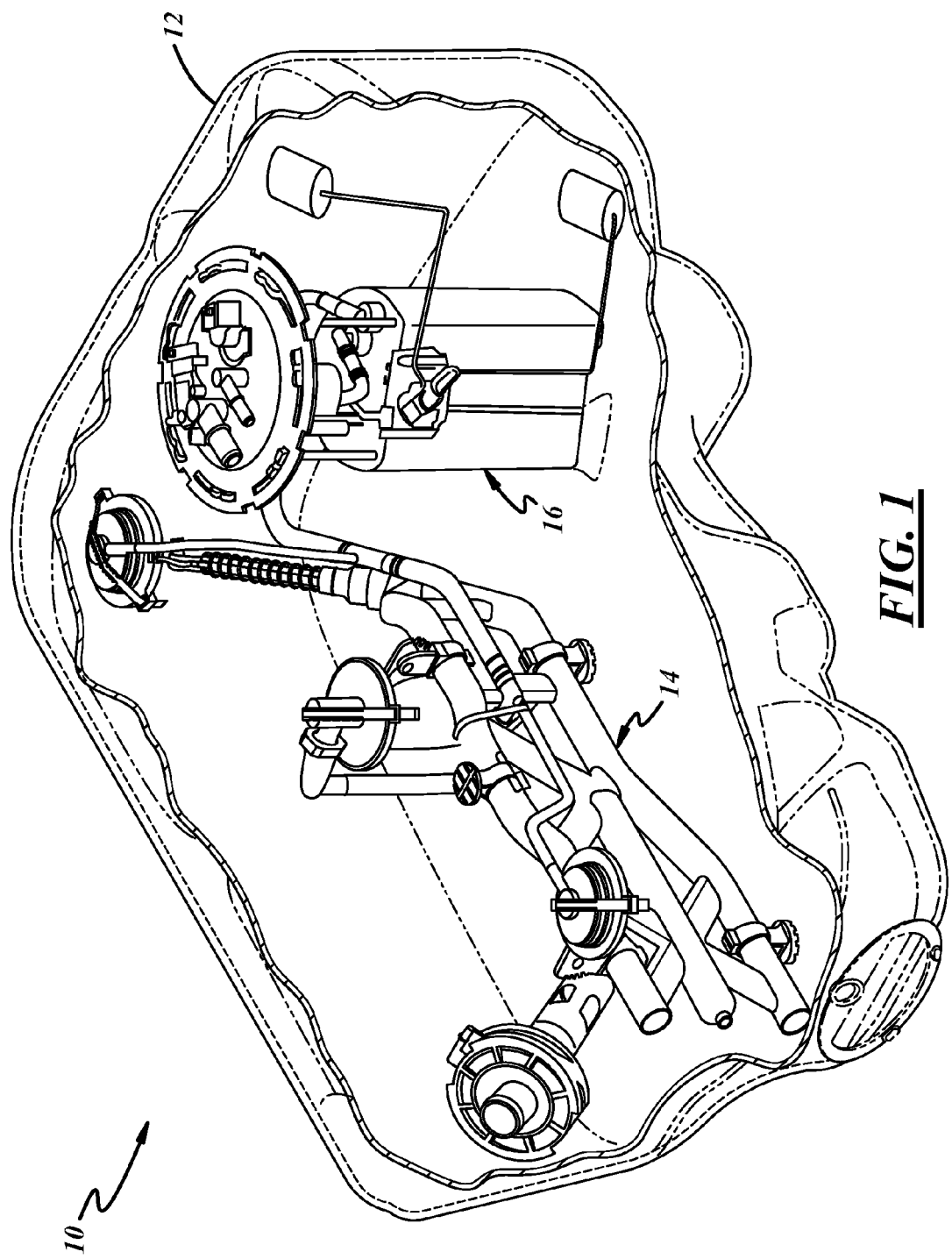
FIG. 1 is a fragmented perspective view of a presently preferred form of a fuel tank assembly with a portion of a fuel tank cut away to show various fuel system components carried by a carrier positioned within the fuel tank.

Referring in more detail to the drawings, FIG. 1 illustrates a fuel tank assembly 10 including an application-specific fuel tank 12, and a carrier assembly disposed in the fuel tank 12 and including a common carrier 14 supported within the fuel tank 12, and a plurality of application-specific fuel system products and common components carried by the carrier 14. To eliminate separate assembly of each of the fuel system products and components into the fuel tank 12 after the fuel tank 12 is formed, the fuel tank 12 is formed around the carrier 14 and the fuel system products. The fuel tank assembly 10 may also include a fuel delivery module 16, which may be assembled to the tank 12 after the tank 12 is formed.

The fuel tank 12 may be blow molded, injection molded, vacuum molded, or the like, around the carrier 14 and components. For example, exemplary fuel tank manufacturing methods are disclosed in U.S. Pat. Nos. 6,712,234 and 7,097,445, and U.S. Patent Application 20050040567, all of which are assigned to the assignee hereof and are incorporated herein by reference in their entireties.

Figure 2:
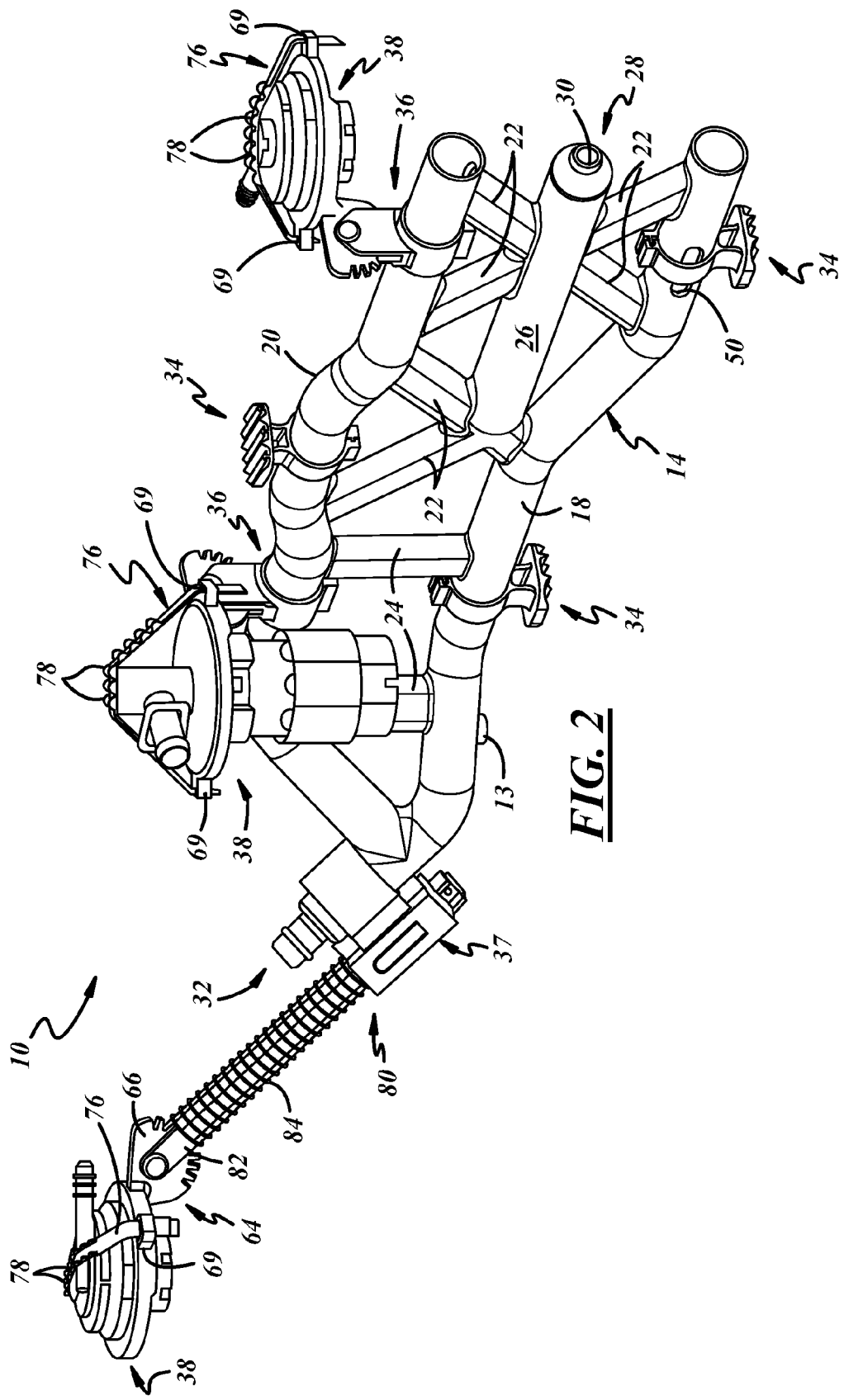
FIG. 2 is a perspective view of the carrier and fuel system components of FIG. 1.
Figure 3:
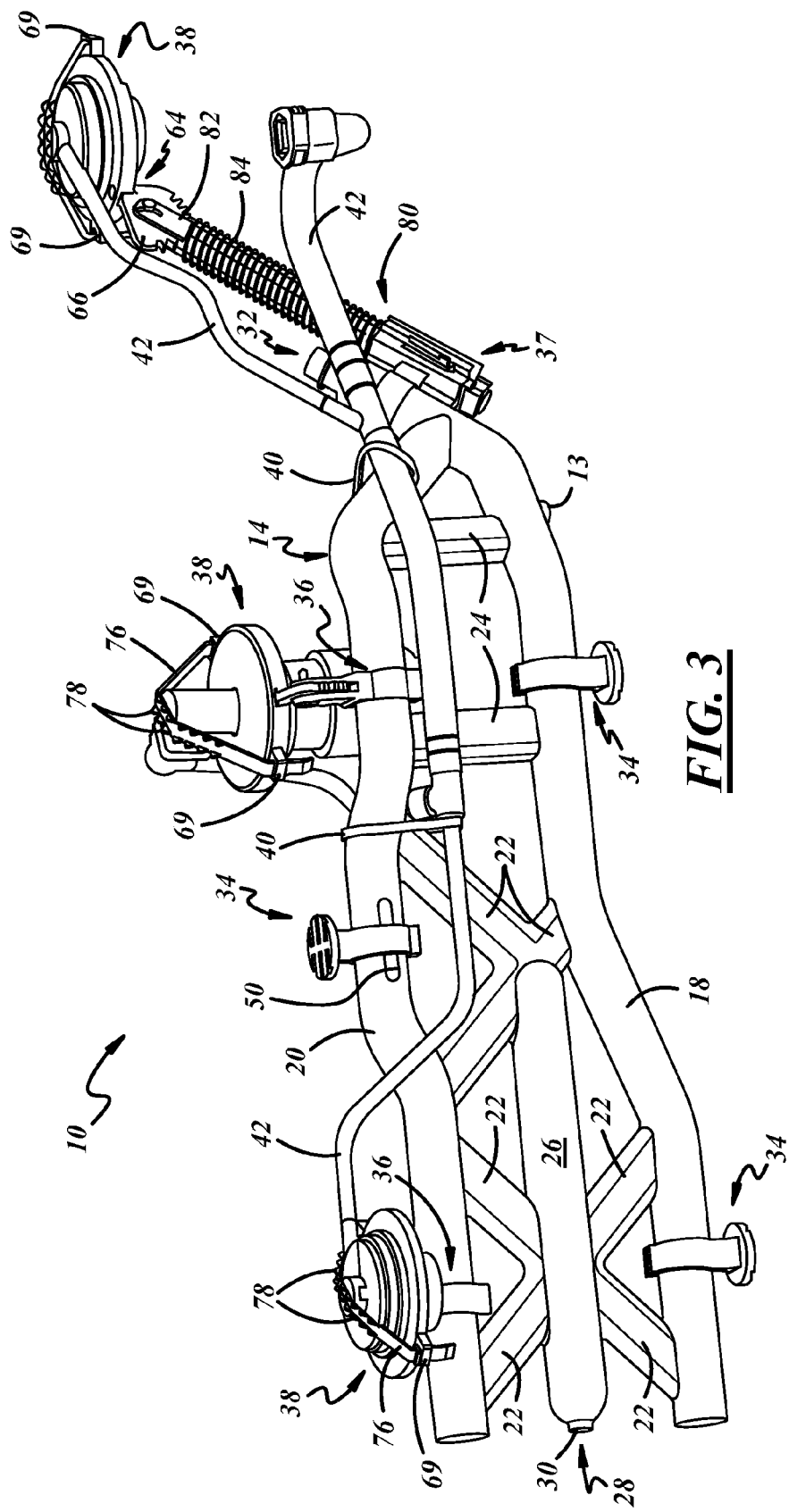
FIG. 3 is another perspective view of the carrier and fuel system components of FIG. 1.

Referring to FIGS. 2 and 3, the carrier 14 may be common to a plurality of different fuel tank assemblies so that the same carrier 14 may be used in different products. The carrier 14 may be composed of any suitable material(s) and constructed in any suitable manner. For example, the carrier 14 may be composed of plastic, which may be injection molded, blow molded, or the like. In another example, the carrier 14 may be composed of metal that may be stamped, welded, cast, formed from tube stock, or the like. Also, the carrier 14 may be of any shape and any size and may be unitary or constructed of multiple components coupled together.

In any case, in one exemplary form, the carrier 14 may include a lower beam 18, an upper beam 20, a plurality of cross members 22, 24 connecting the beams 18, 20, and a blow pin guide post 26 connected to at least some of the cross-members 22 between the beams 18, 20. The carrier 14 may also include an upstream end 28 including a hole 30 in the blow pin guide post 26, and wherein the beams 18, 20 may be open. The carrier 14 may also include a downstream end 32 distal the blow pin guide post 26. As shown, the downstream end 32 may include a fitting for securing ends of wiring, conduit, or conduit such as a vapor line quick connector. The beams 18, 20 and/or cross-members 22, 24 may be at least partially hollow so as to conduct fuel therethrough. The carrier 14 may also include a drain 13 to drain fuel out of the carrier 14. In any event, the carrier 14 may be a relatively rigid structure capable of carrying various fuel system products and components. The carrier 14 may be composed of any fuel resistant polymer, metal, or any other suitable material.

Figure 11:
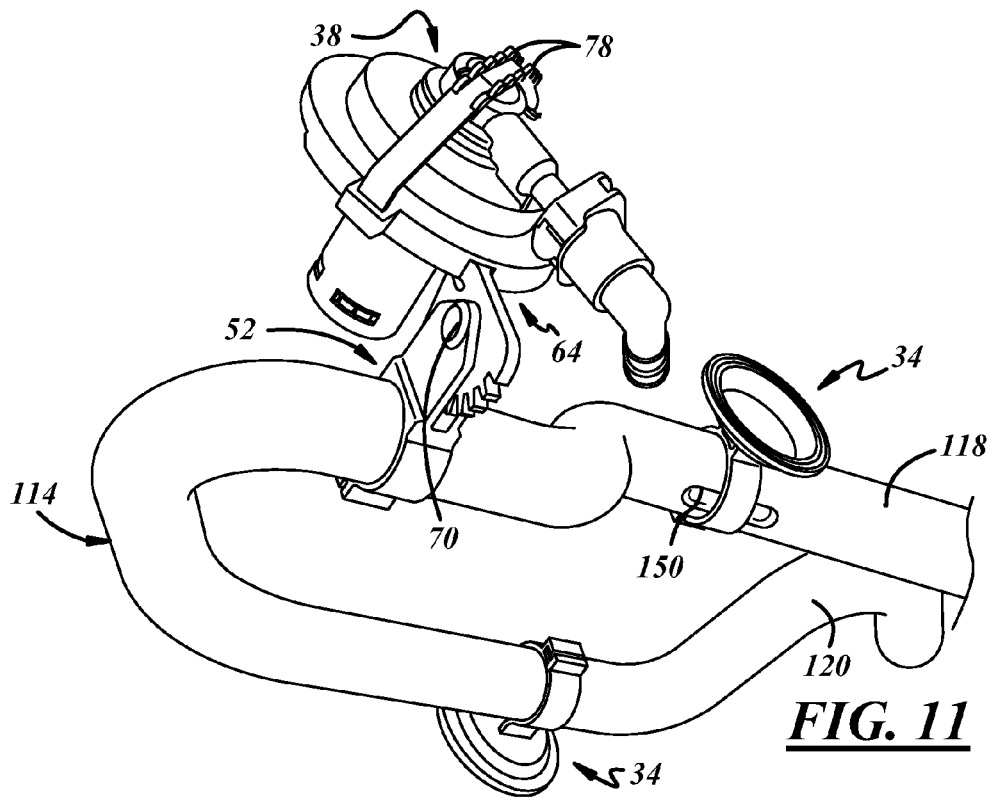
FIG. 11 is an enlarged perspective view of a portion of the carrier and fuel system components of FIG. 1.

Referring to FIG. 11, another embodiment of a carrier 114 may include an upper beam 118 and a lower beam 120 fused, welded, or otherwise coupled to one another in any suitable manner at corresponding portions thereof to provided additional rigidity. Such coupled portions may supplement or replace the need for cross members.

Referring again to FIGS. 2 and 3, as used herein, the term application-specific includes fuel tanks or other products that may be designed for a particular vehicle make/model with particular size and performance specifications and the like. Exemplary application-specific products 38 may include any components, modules, or the like suitable for use in a fuel tank. For example, the products 38 may include fill limit vapor valves (FLVV) to provide flow passage from a fuel tank vapor dome to an emission apparatus such as a charcoal canister (not shown) located externally of the fuel tank. In another example, the products 38 may include grade vent valves (GVV's) or roll-over valves (ROV's) to control tank filling qualities and venting capabilities. In other examples, the products 38 may include charcoal canisters, fuel delivery modules, fuel filters, fuel pickups, or the like.

Common mounting components may include common carrier mounts 34 that may be coupled to the beams 18, 20 to locate the carrier 14 within the fuel tank 12 (FIG. 1), and common mounting brackets 36, 37 that may be coupled to the beams 18, 20 to locate application-specific fuel system products 38 with respect to the carrier 14. As shown in FIG. 3, the common mounting components may also include common mounting straps 40 that may be used to hold various fuel lines 42 in place that may be used to interconnect the products 38. As used herein, the term common includes components that are substantially the same for use in more than one application-specific fuel tank assembly so that the same component may be used in different products.

Figure 4:
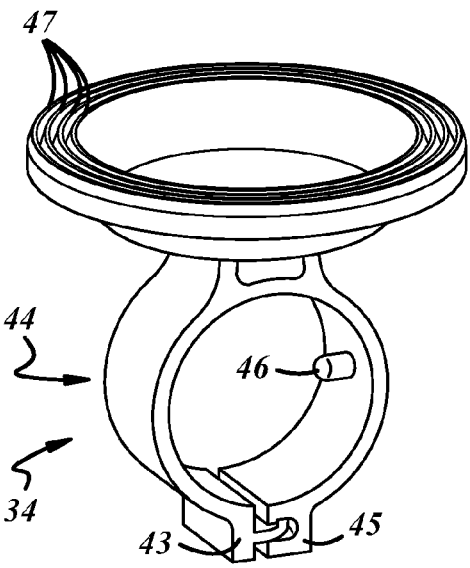
FIG. 4 is a perspective view of one form of a carrier mounting foot of the fuel tank assembly of FIG. 1.

Referring to FIG. 4, one form of a carrier mount 34 may include a band clamp 44 including free ends 43, 45 with corresponding interengagement features, and including at least one locating feature 46. The band 44 of the carrier mount 34 allows for the mount 34 to be circumferentially secured around corresponding portions of the beams 18, 20 of the carrier 14. In one form, and referring to FIG. 6, the carrier 14 may be provided with one or more locating features 50 to cooperate with the locating feature 46 of the carrier mount 34, for example, to resist rotation and/or translation with respect to the carrier 14. The locating feature 46 may be a pin or projection that may fit into a corresponding depression or hole in the carrier 14 so as to key the mount 34 to the carrier 14. Or, the locating feature 46 may be carried in a corresponding slot or groove in the carrier 14 to allow the mount 34 to translate, but not rotate, during expansion and/or contraction of the tank 12 (FIG. 1). Alternatively, the locating feature 46 may self-pierce or indent a corresponding portion of the carrier 14 upon connection of the ends 43, 45 of the band clamp 44.

Referring again to FIG. 4, the carrier mount 34 may also include a mounting pad 48 coupled to the band clamp 44, integrally or otherwise, for fusing, welding, or otherwise coupling hot and soft inside surfaces of the blow molded fuel tank 12 (FIG. 1) as the tank is being molded or after. The mounting pad 48 may be grooved to include concentric rings 47 with concentric annular gaps therebetween. The carrier mount 34 may be composed of any suitable fuel resistant polymeric material, for example, virgin or filled HDPE.

Figure 5:
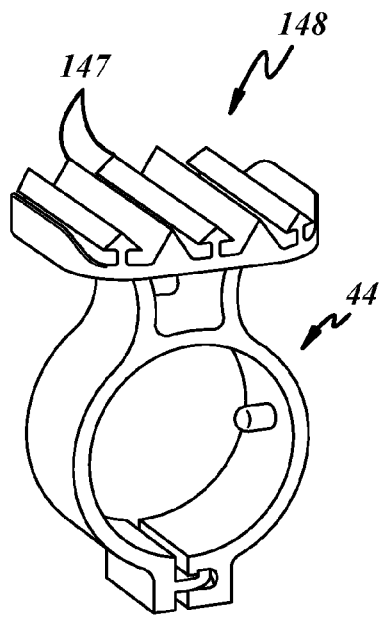
FIG. 5 is a perspective view of another form of the carrier mounting foot of the fuel tank assembly of FIG. 1.

In another form of a carrier mount 134, shown in FIG. 5, a mounting pad 148 may instead include alternating arrowhead and triangular projections 147. This geometry may be provided for a mechanical interlock into the tank material. An exemplary material composition may be 33% GF PA 66 instead of HDPE to embed into a non-weldable inner surface such as or TI Automotive's AS6 material, which may combine two barrier materials ethylene vinyl alcohol copolymer (EVOH) and ATOFINA'S ORGALLOY(R) FT104 nylon-based alloy.

Figure 6:
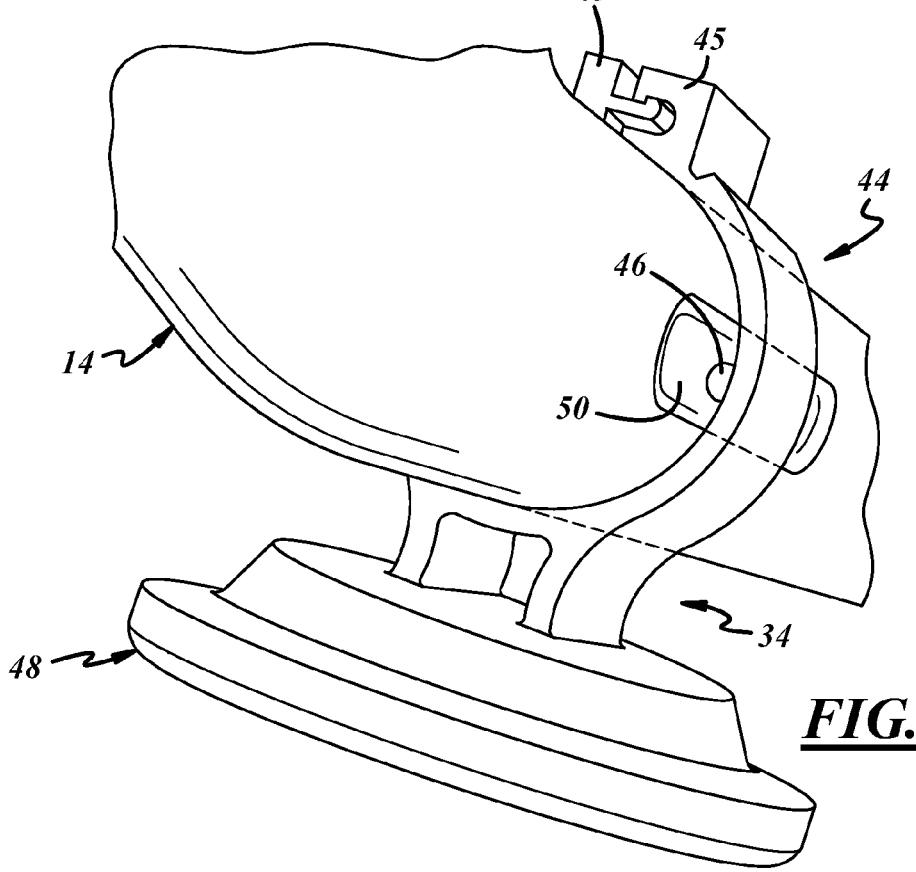
FIG. 6 is an enlarged perspective view of a portion of the fuel tank assembly of FIG. 1, showing the carrier mounting foot mounted to the carrier.

In any case, referring generally to FIGS. 2 and 3 and specifically to FIG. 6, the carrier mount 34 may be positioned with respect to the carrier 14 in any desired location and orientation and in any desired quantity. As shown, two carrier mounts 34 may be coupled to the lower beam 18 of the carrier 14 for engagement with corresponding portions, such as on a lower inside surface, of the fuel tank 12, and one carrier mount 34 may be coupled to the upper beam 20 of the carrier 14 for engagement with another corresponding portion, such as an upper inside surface, of the fuel tank 12. Thus, the carrier mounts 34 may be coupled to the carrier 14 and/or to the fuel tank 12 in any of a plurality of application-specific positions depending on the particular configuration of the fuel tank 12 into which the carrier assembly will be molded or formed.

Referring to FIG. 7, one form of the common mounting bracket 36 of FIGS. 2 and 3 may include a common mounting bracket 52 that may be coupled to a corresponding portion of the carrier 14 in any suitable manner. The mounting bracket 52 may include a band clamp 54 including free ends 53, 55 with corresponding interengagement features. The bracket 52 may have the same or similar band clamping features as the above-described carrier mounts 34. The bracket 52 may include two transversely oriented molded pins 56, 57 that allow for positive locking and error proof orientation on the carrier 14. By altering corresponding hole locations in the carrier 14, this bracket 52 may be oriented in any suitable angular orientation on the carrier 14. The mounting bracket 52 may also include spaced apart mounting arms 58 coupled to the band clamp 54 in any suitable manner such as being integral therewith. The mounting arms 58 may include one or more holes 60 therethrough, and one or more positioning features such as a pawl 62 to mesh with another component as will be described in further detail below. An exemplary material composition for the bracket 52 may be 335 GF PA 66.

Referring to FIG. 8, one form of a common product holder 64 may be pivotably adjustable with respect to the carrier 14, wherein an application-specific product may be coupled to the holder 64 so that the product also may be pivotably adjustable with respect to the carrier 14. The product holder 64 may include a mounting arm 66 with a pivot hole 65 therethrough and a plurality of positioning features 67 such as detents defined, for example, by spaced apart teeth in the form of a sector gear. The features 67 may allow the holder 64 to be carried in a plurality of discrete adjustment positions. Those of ordinary skill in the art will recognize that another embodiment may involve reversing the positioning features of the product holder 64 and its corresponding bracket 52. The product holder 64 may also include a flange 68 such as a ring coupled to the mounting arm 66 and mountable with an application-specific product, integrally or otherwise, and including engagement features 69 such as zip tie sockets at opposed sides.

The product holder 64 may be adapted to carry many different fuel system products 38 (FIG. 1). The product holder 64 may be of a common size for many different application-specific fuel system products, and the positioning features 67 may allow, for example, 15 degree or other incremental positioning of the product holder 64 about the carrier 14. An exemplary material composition may be a 16% or 33% glass filled PA 66. The inside diameter of the hole in the holder may be varied to assist in positioning and securing a wide variety of add on components.

Referring to FIGS. 9 and 10, a rivet 70 is shown in deactivated and activated positions, respectively. The rivet 70 includes a body 72 having a flange 73, and a plunger 74 (FIG. 9) generally axially carried in the body 72 with tangs 75 (FIG. 10) that are generally transversely extended through the body 72 when the plunger 74 is advanced into the body 72. An exemplary rivet may include an R-LOK brand fastener available from ITW Engineered Fasteners of Chippewa Falls, Wis. The rivet 70 may be used to couple the mounting brackets 52 to the product holders 64.

Figure 12:
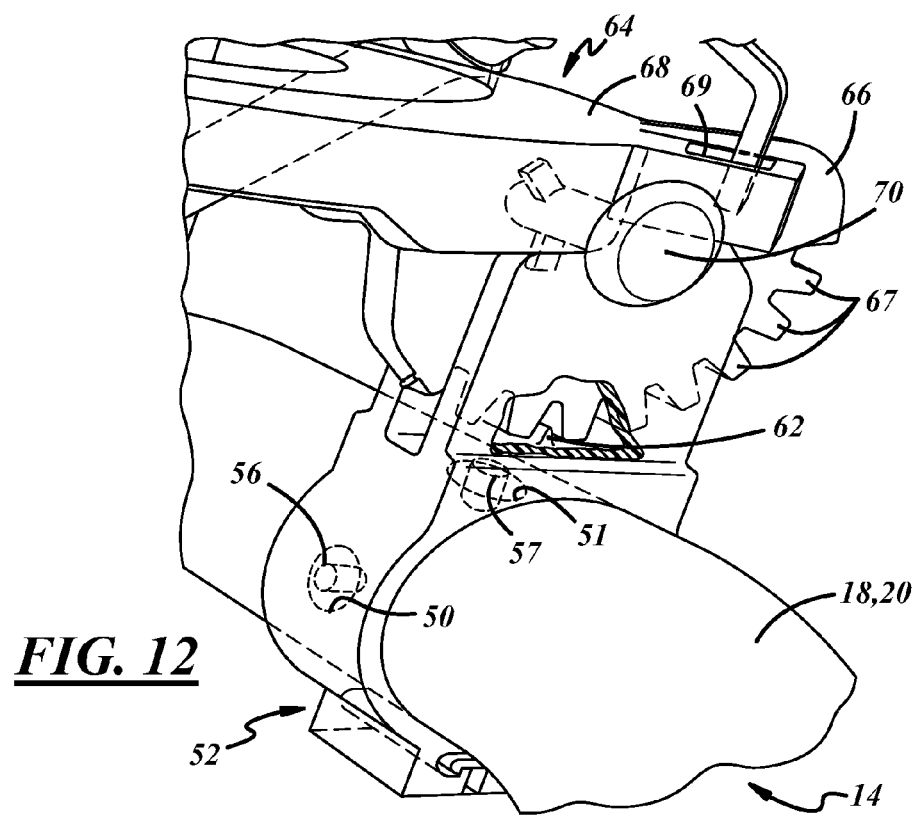
FIG. 12 is an enlarged perspective view of a portion of the fuel tank assembly of FIG. 1, showing the common product holder of FIG. 8 coupled to the component mounting bracket of FIG. 7 by the activated rivet of FIG. 10.

Referring to FIG. 12, the product holder 64 of FIG. 8 may be carried by one or both of the beams 18, 20 of the carrier 14 in any desired location and orientation. In one form, the carrier 14 may be provided with locating features 50, 51 to cooperate with the locating features 56, 57 of the bracket 52. For example, the locating features 50, 51 of the carrier 14 may be indentations such as holes or slots into which the locating features 56, 57 of the mounting bracket 52 to resist rotation and/or translation with respect to the carrier 14. Alternatively, the locating features 50, 51 may self-pierce or indent a corresponding portion of the carrier 14 upon connection of the ends of the band clamp 54. Also, the product holder 64 may be angularly oriented and maintained in position with respect to the bracket 52 by the locating pawl 62 that engages a corresponding one of the positioning detents 67 of the product holder 64. The rivet 70 is inserted through the holes of the arms 58, 66 of the bracket 52 and flange 64.

Referring to FIG. 13, a mounting strap 76 includes opposite ends 75, 77 with interengagement features that cooperate with the sockets 69 of the product holder 64 (FIG. 8). The engagement features of the sockets 69 and the strap ends 75, 77 may be identical to or similar as electrical zip tie features. The strap 76 may also include an intermediate section between the ends 75, 77 that includes a plurality of projections 78 to engage one or more surfaces of the fuel tank 12 during blow molding thereof or after. Accordingly, the projections 78 may mechanically bind, fuse, or weld to the tank 12 to provide additional stability for the carrier assembly, and component location anchoring.

As best shown in FIGS. 2 and 3 the straps 76 are assembled to the product holders 64 over various types of products 38 to firmly retain the products 38 to the product holders 64. The straps 76 may be sized to retain any given product to the product holders 64. One end of each strap 76 may be inserted into the corresponding flange socket 69 to a stop or a hilt on the strap 76 and the other end of the strap 76 is inserted into an opposite flange socket 69 to secure the product 38. The projections 78 of the strap 76 allow the strap 76 and product 38 to be fused, welded, or otherwise coupled to an inner surface of the parison or tank 12 (FIG. 1) as it is being blow molded. The strap 76 may be composed of any material, for example, a 13% or 15% Talc filled HDPE or a 16% GF PA 66 if the projection welding function is not desired.

Referring to FIGS. 2 and 3, the fuel tank assembly 10 may also include a positioning mechanism 80, which may be preset to a desired position, or may be deployed to move one or more of the products 38 during blow molding of the fuel tank 12 or after. The positioning mechanism 80 may include a common positioning rod 82, a common rod mounting bracket 37 to translatably couple the positioning rod 82 to the carrier 14 according to one or more discrete adjustment positions, and a biasing member 84 such as a compression spring between the bracket 37 and the product holder 64 to bias the positioning rod 82 in a direction away from the carrier 14 and toward a deployed position.

Referring to FIG. 14, the rod mounting bracket 37 may include the band clamp 44 including the free ends 43, 45 with the corresponding interengagement features, and may also include at least one locating feature (not shown). The rod mounting bracket 37 may also include a rod housing 86 that may be integral with or otherwise coupled to the band clamp 44 to accept the positioning rod 82 therethrough. Ribs 88 may be provided on the exterior of the housing 86 to define a seat for the biasing member 84. On the side of the rod housing 86 there may be provided a one-way cantilevered pawl 90 to engage corresponding portions of the positioning rod 82. The bracket may be composed of, for example, 16% or 33% GF PA 66, or any other suitable material.

Referring to FIG. 15, the positioning rod 82 may enable static or dynamic location of components in increments of, for example, 10 mm along it's length and, for example, 15 degrees of angular orientation. Also, the rod 82 may be adapted to carry any suitable carrier mounts (not shown) that may be extended to positions that portions of the carrier 14 cannot reach. In any case, the positioning rod 82 may include spaced apart mounting arms 92 between which the product holder arm 66 is located and held thereto using one of the rivets 70 extending through holes 93 in the arms 92. The product holder 64 (FIG. 8) may be angularly maintained in position by a positioning feature such as a locating pawl 94 that may interengage with the detents of the product holder 64. The positioning rod 82 may also include one or more positioning features such as detents 96 for cooperating with the one-way cantilevered pawl 90 of the rod mounting bracket 37, and ribs 98 and opposed slots 97 that may cooperate with a cotter pin (not shown). An exemplary material for the rod 82 may be a 16% or 33% GF PA 66 or AMODEL AT 1116 or the like.

Referring now to FIG. 16, the positioning mechanism 80 is shown in a retracted state with a portion of the rod mounting bracket 37 removed for clarity. In the retracted state, the rod 82 may be inserted while the pawl 90 is lifted so the rod 82 is free to slide into the bracket 37 to a desired position. The positioning mechanism 80 may also include a rip cord C temporarily coupled to the positioning rod 82 and releasable therefrom to allow the biasing member 84 to deploy the rod 82 to its deployed position. The rip cord C may have one end inserted into one of the detents 96 of the positioning rod 82 behind the rod mounting bracket 37. The rip cord C prevents the compressed coil biasing member 84 from advancing the rod 82, until the rip cord C is pulled out of its corresponding detent 96 in the rod 82.

In one implementation, the rip cord C may be a sacrificial component with an opposite end that may attach to an inner tank wall. As the tank 12 is blown, the opposite end of the rip cord C adheres to a movable portion of the inner wall, which may move and pull the rip cord C to allow the positioning mechanism 80 to be deployed. In another implementation, the opposite end of the rip chord C may extend out of an opening of the fuel tank 12 (FIG. 1) and may be manually or automatically pulled in any suitable manner during molding or after the fuel tank 12 is molded.

In any event, once the rip cord C is pulled, as shown in FIG. 17, the force of the biasing member 84 advances the common product holder 64 and rod 82, with the pawl 90 deflected at each rib 98 of the rod 82, until further advancement of the rod 82 is prevented by a hard stop such as a clip 99 disposed in opposed slots 97 between the ribs 98 of the rod 82 and locating against the rod mounting bracket 37. At this point, the pawl 90 drops into position behind a respective rib 98 to prevent the rod 82 from retracting and to lock the rod 82 in position so it may not drop back out of position during vehicle life. The clip 99 may be a cotter pin used as a positive stop for deploying products carried on movable rods and as an insertion stop for products carried on stationary rods. An exemplary material for the rip cord C may be HDPE, and the clip 99 may be composed of any suitable material such as a zinc-coated spring wire.

In the static or fixed embodiment of the positioning mechanism 80, the spring is omitted, the pawl 90 is deflected to allow the rod 82 to be moved with respect to the bracket 37 to a desired position, and then the pawl 90 is dropped into detent behind a respective rib 98 to lock the rod 82 in place so it may not be further advanced with respect to the bracket 37. The rod 82 may carry any suitable component and this static arrangement of the positioning mechanism allows the carrier assembly to be customized for multiple different fuel tanks. In either case, an application-specific product may be translatably adjustable with respect to the carrier 14 by being carried by the common product holder 64, which may be coupled to the translatable and adjustable positioning rod 82.

FIG. 18 illustrates another common rod mounting bracket 137 that may include the band clamp 44 including the free ends 43, 45 with corresponding interengagement features, and including at least one locating feature 46. The rod mounting bracket 137 may also include a rod housing 186, which is clocked ninety degrees compared to the rod housing 37 of FIG. 14. Accordingly, the rod mounting bracket 137 may be used for orienting the positioning rod 82 perpendicularly with respect to a beam of the carrier 14.

FIG. 19 illustrates an exemplary application of the rod mounting bracket 137 of a positioning mechanism 180 and that may be coupled to the carrier 14 as described previously. The positioning mechanism 180 may be a static mechanism that is pre-set in contrast to the dynamic, deployable positioning mechanism 80 described previously. The positioning mechanism 180 may be used to set a relationship between the carrier 14 and a fuel system product F, which, for example, may locate against a bottom B of the fuel tank 12. The positioning rod 82 extends through the bracket 137 and may be translatably fixed thereto by a clip 99 coupled to the rod 82 on one side of the bracket 137 and by a pawl 190 of the housing 186. An end of the positioning rod 82 includes the mounting arms 92 between which a mounting arm 166 of the fuel device F is coupled in any suitable manner such as by the rivet 70 of FIGS. 9 and 10.

According to another embodiment, a method of manufacturing a plurality of different fuel tanks includes providing a common carrier used in all of the plurality of different fuel tanks.

A plurality of common mounting brackets is coupled to the common carrier and a plurality of common product holders is coupled to the brackets according to a first coupling configuration. A plurality of fuel system products are mounted to the plurality of common product holders according to a first mounting configuration. The common carrier with the components mounted thereto according to the first mounting configuration is inserted into a first parison. The first parison is blow molded around the common carrier with the components mounted thereto according to the first mounting configuration and into conformity with a first blow mold to produce a first fuel tank of the plurality of different fuel tanks.

A second plurality of common mounting brackets is coupled to the common carrier and a second plurality of common product holders is coupled to the brackets according to a second coupling configuration. A second plurality of fuel system components is mounted to the second plurality of common product holders according to a second mounting configuration. The common carrier with the second plurality of fuel system components mounted thereto according to the second mounting configuration is inserted into a second parison. The second parison is blow molded around the common carrier and mounted components into conformity with a second blow mold to produce a second fuel tank of the plurality of different fuel tanks.

In general, the components of the fuel tank assembly can be manufactured according to techniques known to those skilled in the art, including molding, machining, stamping, tube bending, and the like. Also, the components, modules, and assemblies can be assembled according to known techniques. Likewise, any suitable materials can be used in making the components, such as metals, composites, polymeric materials, and the like. Such materials can be selected based on their dimensional stability and resistance to swelling and degradation in warm and cold petroleum product environments. The phrase polymeric material(s) generally means relatively high-molecular-weight materials of either synthetic or natural origin and may include thermosets, thermoplastics, and elastomers.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A fuel tank assembly, comprising:
    a fuel tank to contain fuel therein and having an upper inside surface and a lower inside surface of spaced-apart polymer walls; and
    a carrier assembly disposed in the fuel tank and including
    a plurality of application-specific fuel system products;
    a common carrier configured for receipt in a plurality of different configurations of fuel tanks, usable in more than one application specific fuel tank configuration, and having at least one elongate and at least partially hollow beam spaced apart from both the upper and lower surfaces of the polymer walls of the fuel tank, the beam carrying a plurality of the application-specific fuel system products;
    at least one separate common carrier mount having a polymer band clamp connected to the common carrier beam, with the band clamp having a locator projection or recess, interengaged with a complimentary recess or projection of the common carrier beam and restraining at least one of translation or rotation of the common carrier relative to the common carrier mount, and an integral polymer mounting pad as part of and carrying the carrier mount band clamp and permanently fixed to one of the inside wall surfaces of one of the walls of the fuel tank;

a plurality of separate product common mounting brackets each having a polymer band clamp connected to at least one beam of the common carrier; and a product holder connected to and carried by the product mounting bracket and carrying one of the plurality of the application specific fuel system products.

2. The fuel tank assembly of claim 1, wherein at least one of the common carrier mounts is coupled to the beam of the common carrier in an application-specific position with respect to the common carrier before the fuel tank is blow molded and also fixed to the fuel tank according to an application-specific position with respect to the fuel tank after the fuel tank is blow molded.

3. The fuel tank assembly of claim 1, wherein the polymer band clamp of the product common mounting brackets includes projections for engaging the beam of the common carrier, and the mounting pad of the common carrier mount carrier includes at least one of a plurality of concentric rings or alternating arrowhead and triangular projections to engage the fuel tank.

4. The fuel tank assembly of claim 1, wherein the product holder is pivotably adjustable with respect to the product common mounting bracket; and the product carried by such product holder is thereby pivotably adjustable with respect to the common carrier.

5. The fuel tank assembly of claim 1, wherein the product holder includes a flange to hold one of the application specific products and a mounting arm coupled to the product holder and including positioning features, and wherein the product common mounting bracket includes a mounting arm coupled to the clamp to carry the mounting arm of the product holder, and at least one positioning feature to cooperate with the positioning features of the mounting arm of the product holder for holding the mounting arm in one of a plurality of different pivotable positions.

6. The fuel tank assembly of claim 5, further comprising a mounting strap having one end coupled to a corresponding portion of the product holder, another end coupled to another corresponding portion of the product holder, and an intermediate section between the ends to retain the product to the product holder and including projections connected to the fuel tank.

7. The fuel tank assembly of claim 4, wherein the common components further include:

a common rod mounting bracket coupled to the beam of the common carrier; and a common positioning rod translatably coupled to the common rod mounting bracket, wherein the common product holder is coupled to the common positioning rod, such that the one of the application specific products is also translatably adjustable with respect to the common carrier.

8. The fuel tank assembly of claim 7, wherein the common product holder includes a flange to hold one of the application specific products and a mounting arm coupled to the product holder and including positioning features, and wherein the common rod mounting bracket includes a band clamp coupled to a corresponding portion of the common carrier and a rod housing coupled to the band clamp to translatably carry the common positioning rod therein, and also wherein the common positioning rod includes a mounting arm to pivotally carry the mounting arm of the common product holder and at least one positioning feature to cooperate with the positioning features of the mounting arm of the common product holder for holding the mounting arm in one of a plurality of different pivotable positions.

9. The fuel tank assembly of claim 7, further comprising a biasing member to bias the common positioning rod toward a deployed position.

10. The fuel tank assembly of claim 9, further comprising a rip cord temporarily coupled to the common positioning rod and releasable therefrom to allow the biasing member to deploy the rod toward the deployed position.

11. The fuel tank assembly of claim 1, wherein the carrier includes an upper beam, a lower beam, and a plurality of cross members coupling the upper and lower beams to one another.

12. The fuel tank assembly of claim 11, wherein the carrier further includes a blow pin hollow guide post coupled to at least some of the cross members between the upper and lower beams.

13. The fuel tank assembly of claim 1, wherein the common carrier is at least partially hollow providing a conduit for fuel flow therethrough.

14. A fuel tank assembly comprising:

a fuel tank to contain fuel therein and having spaced-apart upper and lower wall portions; and a carrier assembly disposed in the fuel tank and including a common carrier configured for receipt in a plurality of different configurations of fuel tanks and usable in more than one application specific fuel tank configuration and having at least one elongate beam spaced from and between the upper and lower wall portions, a fuel system product carried by the beam, and a positioning mechanism carried by the beam to locate the fuel system product in a desired position within the fuel tank and including:

a polymeric rod mounting bracket including a band clamp coupled to and carried by the beam;

a rod housing carried by the rod mounting bracket and configured for slidably carrying a positioning rod; and an elongate positioning rod coupled to the fuel system product and slidably carried by the rod housing of the rod mounting bracket for generally longitudinal movement of the positioning rod relative to the rod housing to at least one of a plurality of discrete longitudinal adjustment positions to locate the fuel system product in the desired position within the fuel tank.

15. The fuel tank assembly of claim 14, further comprising a product holder that includes a flange to hold the fuel system product and a mounting aim coupled to the product holder and including positioning features, and wherein the positioning rod includes a mounting arm to pivotally carry the mounting arm of the product holder and at least one positioning feature to cooperate with the positioning features of the mounting arm of the product holder for holding the product holder in one of a plurality of different pivotable positions.

16. The fuel tank assembly of claim 14, wherein the rod and rod mounting bracket position the fuel system product against a bottom of the fuel tank.

17. A fuel tank assembly comprising:

a polymer fuel tank to contain fuel therein and having spaced-apart upper and lower walls; and a carrier assembly disposed in the fuel tank and including at least one common carrier elongate beam configured for receipt in a plurality of different configurations of fuel tanks between and spaced apart from the upper and lower walls, a fuel system product carried by the beam, and a positioning mechanism coupled to the beam to locate the fuel system product in a desired position within the fuel tank and including:

a separate product holder mounting bracket coupled to and carried by the beam;

a separate product holder including a flange coupled to the fuel system product and an arm carried by the product holder mounting bracket and movable to at least one of a plurality of discrete adjustment positions; and a polymer mounting strap having one end coupled to a corresponding portion of the product holder, another end coupled to another corresponding portion of the product holder, and an intermediate section between the ends to retain the product to the product holder and the mounting strap including polymeric projections engaging and welded to a polymer wall of the fuel tank.

18. The fuel tank assembly of claim 17, wherein the arm includes a plurality of positioning features, and the product holder mounting bracket includes a polymer band clamp coupled to the carrier, mounting arms coupled to the band clamp to pivotally carry the arm of the product holder therebetween, and a pawl to cooperate with the positioning features of the arm for holding the product holder in one of a plurality of different pivoted positions.

19. A carrier to carry components within a fuel tank having spaced-apart upper and lower wall portions, comprising:

a polymer upper beam;

a polymer lower beam spaced from the upper beam;

a plurality of polymer cross members connecting the upper and lower beams to one another; and a blow pin hollow polymer guide post disposed between and spaced from the upper and lower beams and connected to at least some of the cross members between the upper and lower beams;

the upper beam, lower beam, cross members and guide post each being configured to be spaced from the upper and lower wall portions of the fuel tank;

wherein at least one of the carrier beams is at least partially hollow providing a conduit to conduct fuel flow therethrough.

* * * * *